United States Patent [19]
Kopp

[11] Patent Number: 5,680,504
[45] Date of Patent: Oct. 21, 1997

[54] APPARATUS AND METHOD FOR STORING AND REPRODUCING DIGITAL DATA

[75] Inventor: Dieter Kopp, Hemmingen, Germany

[73] Assignee: Alcatel NV, Netherlands

[21] Appl. No.: 381,130

[22] Filed: Jan. 31, 1995

[30] Foreign Application Priority Data

Feb. 2, 1994 [DE] Germany ............... 44 02 901.2

[51] Int. Cl.$^6$ ............... G10L 9/18; G11C 16/02
[52] U.S. Cl. ............. 395/2.1; 395/430; 365/230.03; 365/189.02
[58] Field of Search ............. 395/2.1, 430; 365/189.01, 365/189.02, 230.02, 230.03

[56] References Cited

U.S. PATENT DOCUMENTS

| | | | |
|---|---|---|---|
| 4,970,692 | 11/1990 | Ali et al. | 365/230.06 |
| 5,031,205 | 7/1991 | Philips | 379/88 |
| 5,241,689 | 8/1993 | Schwed et al. | 455/54.1 |
| 5,262,991 | 11/1993 | Pope | 365/189.02 |
| 5,293,562 | 3/1994 | Pope | 365/189.02 |

FOREIGN PATENT DOCUMENTS

| | | |
|---|---|---|
| 0557968 | 9/1993 | European Pat. Off. . |
| 0567135 | 10/1993 | European Pat. Off. . |
| 3632478 | 3/1988 | Germany . |
| 2259379 | 3/1993 | United Kingdom . |

OTHER PUBLICATIONS

"Flash–memory ICs redefine program and data storage for portable applications", by Gary Legg, from EDN, Apr. 15, 1993, pp. 71–74.

Primary Examiner—Allen R. MacDonald
Assistant Examiner—Tálivaldis Ivars Šmits
Attorney, Agent, or Firm—Ware, Fressola, Van Der Sluys & Adolphson

[57] ABSTRACT

In the prior art, DRAMs (Dynamic Random Access Memories) are used to store and reproduce digital data, or ARAMs (Audio Random Access Memories) are used to store and reproduce speech. The components are expensive and lose their stored data if the power fails. The present device and method uses electrically erasable, programmable read-only-memories, the so-called EEPROMs (Electrically Erasable and Programmable Read Only Memories), in a block structure for mass storage applications with control software. A digital signal processor (DSP) is directly connected to the read-only-memory (EEProm), which is partitioned into segments. Software drivers in the digital signal processor (DSP) enable the segment by segment writing and reading between the digital signal processor and the read-only-memory.

10 Claims, 2 Drawing Sheets

APPARATUS AND METHOD FOR STORING AND REPRODUCING DIGITAL DATA

TECHNICAL FIELD

The invention concerns a device and a method which serve to store and reproduce digital data, particularly speech data.

BACKGROUND OF THE INVENTION

The state of the art knows that the storage and reproduction of digital data for digital telephone answering machines has many applications.

RAM memory is usually used in this case, as explained in DE 36 32 478 A1.

In particular, digital telephone answering machines use so-called ARAMs (Audio Random Access Memories) or DRAMs (Dynamic Random Access Memories) (see "Tritel Guarda", the telephone with a digital answering machine; ascom, Technical Information; 1,91) or SRAMs (Static Random Access Memories) for storage. When these storage components are used, there is the additional requirement of an uninterrupted power supply to keep the data in the storage components. Therefore, when the external power supply fails, the data must be maintained e.g. by means of a battery. But the use of a battery increases the cost of a digital telephone answering machine, as well as its size and weight.

SUMMARY OF THE INVENTION

The invention has the task of providing a device and a method that avoid the above-mentioned disadvantages.

The invention fulfills this task by a device for storing and reproducing digital data, comprising a digital signal processor and an electrically erasable, programmable read-only-memory, with a number of parallel input/output interfaces of the read-only-memory, which are connected via a data/address bus to parallel input/output interfaces of the digital signal processor, and wherein the connectors of the read-only-memory are connected to other input/output interfaces of the digital signal processor by control lines, and wherein a write enable connector and a read enable connector of the digital signal processor are connected by a first line and by a second line respectively to a write enable and a read enable connector of the read-only-memory. It is aim directed to a device for storing and reproducing digital data, comprising a digital signal processor and an electrically erasable, programmable read-only-memory connected thereto, which is divided into a number of segments, wherein the digital signal processor defines a buffer of the size of a segment of the read-only-memory and an overflow memory, and wherein software drivers and encoding and decoding software are implemented in the digital signal processor. It is further directed to a method for storing digital data by means of a digital signal processor and an electrically erasable, programmable read-only-memory, wherein the digital data are written into a buffer of a memory in the digital signal processor, where the digital data of the buffer are written into a selected segment of the read-only-memory by means of a software driver, and wherein the data produced during the writing process are written into an overflow memory of memory in the digital signal processor, and are copied into the buffer after the writing process.

So-called EEPROMs (Electrically Erasable & Programmable Read Only Memories) can preferably be used to that effect, which are also known under the designation of $E^2PROM$. These semiconductor components find applications in circuit arrangements in which a non-volatile memory is being used.

Lately, so-called Flash-EEPROMs have also become known, which have the property of making erasable and immediately reprogrammable memory available by means of a simple control signal. New generation Flash-EEPROMs can be reprogrammed in blocks. Depending on the application, the block size can be between 64 bytes up to 64 kbytes. Because of the special architecture of the Flash-EEPROMs, they can be used for both program storage applications and mass storage applications ("Flash-memory ICs redefine program and data storage for portable applications"; Gary Legg; from EDN, Apr. 15, 1993, pages 71–74).

The Flash-EEPROMs can find advantageous applications because they represent a cost-effective alternative for known storage components, such as the above described DRAMs.

A Flash-EEPROM can be used as a read-only-memory for storing digital data. A read-only-memory can be used in a block structure for mass storage applications.

The digital data to be stored and reproduced can be digital speech data, such as are present in the speech storage for digital telephone answering machines.

BRIEF DESCRIPTION OF THE DRAWINGS

In the following, the invention will be explained in more detail by means of the figures, where.

BEST MODE FOR CARRYING OUT THE INVENTION

Figure 1:
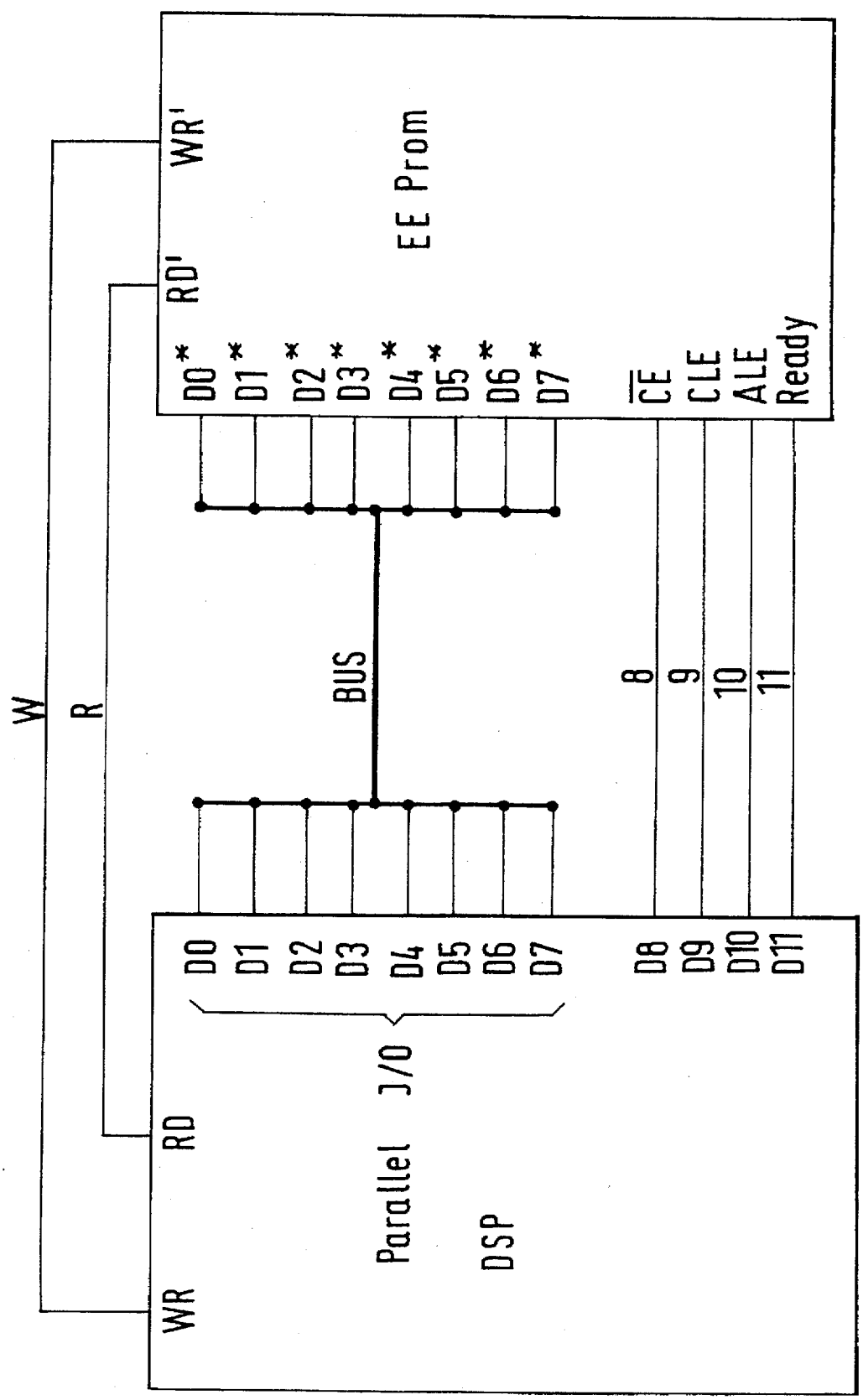
FIG. 1 is a block circuit diagram of a device according to claim 1.

The following explains a configuration example by means of FIG. 1.

A device for storing and reproducing digital data comprises a digital signal processor DSP and an electrically erasable, programmable read-only-memory EEProm. Preferably a read-only-memory is used in block structure for mass storage applications. The digital signal processor DSP has a number of parallel input/output interfaces D0–D7 and other parallel input/output interfaces D8–D11. In addition, the digital signal processor DSP has a write enable connection WR and a read enable connection RR. The other connections, which are found in every digital signal processor, are not shown here for reasons of readability, but are shown and explained in state of the art data books.

The electrically erasable, programmable read-only-memory EEProm has a number of parallel input/output interfaces D0*–D7*, and parallel connections $\overline{CE}$, CLE, ALE, Ready. In addition, the read-only-memory contains a write enable connection WR' and a read enable connection RD'. Here as well, the other connections are not shown for reasons of readability, only the essential connections for the depicted invention are illustrated.

In the device of the invention, the write enable connection WR' of the read-only-memory EProm is connected by a first line W to the write enable connection WR of the digital signal processor DSP. In the same way, the read enable connection RD' of the read-only-memory EEProm is connected by a second line R to the read enable connection RD of the digital signal processor DSP.

All the parallel input/output interfaces D0–D7 of the digital signal processor DSP are connected to a common bus BUS which provides a connection to the parallel input/output interfaces D0*–D7* of the read-only-memory EEProm, all of which are also connected to the bus BUS.

Each of the other input/output interfaces D8–D11 are connected by control lines 8, 9, 10, 11 with the other connections $\overline{CE}$, CLE, ALE, Ready. Specifically, input/output interface D8 is connected to $\overline{CE}$ via control line 8. This connection $\overline{CE}$ is the Chip Enable connection. Control line 9 connects the input/output interface D9 to CLE, which is a Command Latch Enable. Control line 10 connects input/output interface D10 to ALE, which is an Address Latch Enable connection. Control line 11 connects input/output interface D11 to Ready, which is a release connection.

Figure 2:
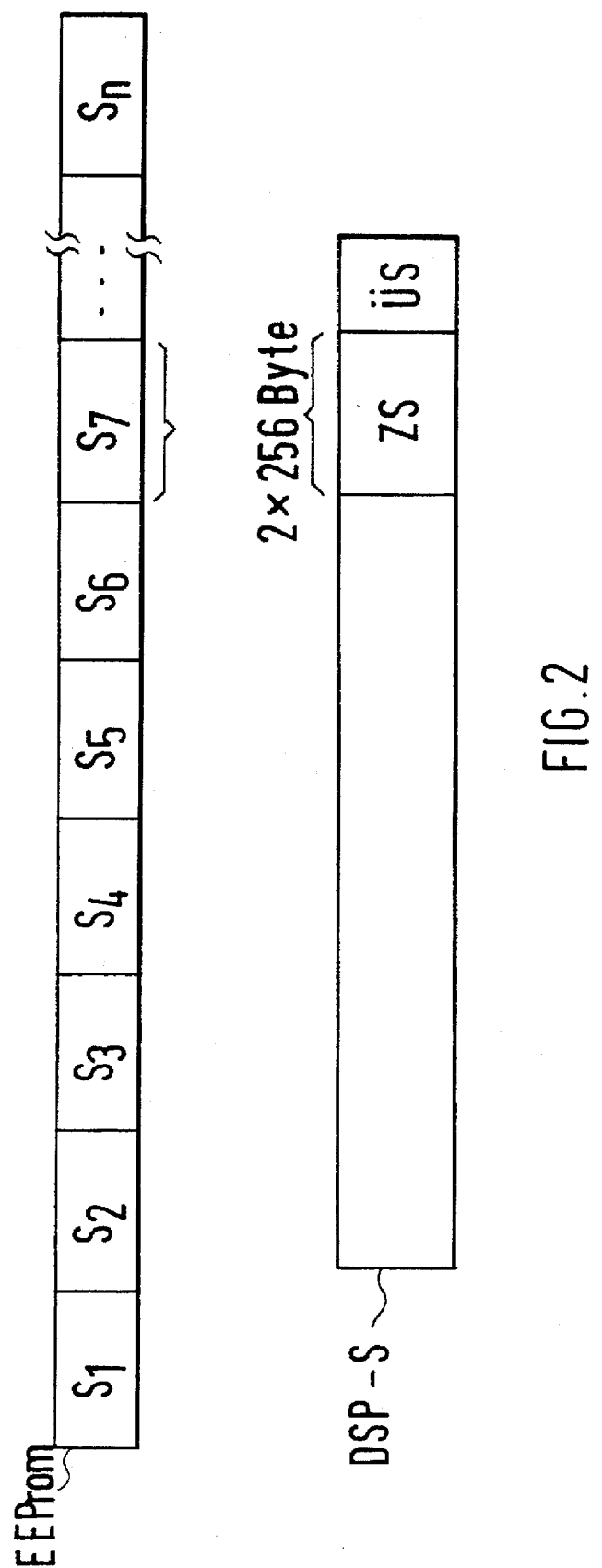
FIG. 2 is a schematic representation of the memory partition.

In the following, the device according to claim 2 is explained by means of FIG. 2.

A device for storing and reproducing digital signals according to the invention comprises a digital signal processor DSP and an electrically erasable, programmable read-only-memory EEProm. The digital signal processor DSP and the read-only-memory EEProm are connected with each other by signal or control lines. The electrically erasable, programmable read-only-memory EEProm is partitioned into a number of segments $S_1$ to $S_n$, where n equals an even number larger than 1. The segments $S_1$ to $S_n$ have a fixed size, for example 2×256 bytes=512 bytes. A memory in the digital signal processor DSP defines a buffer ZS, which corresponds exactly to the size of a segment, in other words 512 bytes for example. An overflow memory ÜS is also defined, whose function will be explained in detail later on. The memory in the digital signal processor DSP also implements software drivers and encoding and decoding software. Their function will also be explained later on.

The following explains a method for storing digital data.

This method stores digital data by means of a digital signal processor DSP, which contains the above described properties and connection points, and by means of an electrically erasable, programmable read-only-memory EEProm, which also contains the above described connection points. A memory DSP-S of the digital signal processor DSP is partitioned into a buffer ZS and an overflow memory ÜS, as already shown in FIG. 2. With this storage method, the digital data are first written into the buffer ZS of memory DSP-S in the signal processor. As already explained with FIG. 2, the read-only-memory is partitioned into a number of segments $S_1$ to $S_n$. The segments have a predefined established size. The size of the buffer also corresponds to the size of segments $S_1$ to $S_n$. For storage, the buffered digital data in buffer ZS are written by one of the software drivers to a selected segment $S_1$ to $S_n$ of read-only-memory EEProm.

The reading and writing of data into and out of the buffer takes place through a decoder/encoder software, which is implemented in the digital signal processor. The decoding software reads data every 20 milliseconds (ms), which data is then stored in the buffer ZS. The encoding software encodes the data from the buffer every 20 ms. Examples of such decoding/encoding software that may be used are CELP (Code Excited Linear Predictive Coding—see "A low-delay CELP coder for the CCITT 16 kb/s speech coding standard", IEEE, J. on Selected Areas in Communications, 10(1992) 5, S. 830–850; by J. H. Chen.) and GSM.

During this process, other data may be developed for the buffer ZS. The data that are developed during this intermediate time are written into the overflow storage ÜS, to prevent data loss and because the buffer is not ready for writing. The overflow storage is also part of memory DSP-S of digital signal processor DSP. The data in the overflow storage are copied to the buffer ZS after the writing process between buffer ZS and read-only-memory EEProm is completed.

To reproduce the stored digital data, the segment of the read-only-memory EEProm selected for the read-out is addressed in a first step. Of course, several selected segments can be addressed in the same way. In the subsequent steps the selected data segments are read into the buffer ZS, for decoding. The software drivers have the rusk of ensuring that data are always written into buffer ZS, so that they can be read out by the decoding software. In particular, the software driver determines if the ZS buffer is empty. The ZS buffer is empty after the buffer is read by the decoding software. Until the decoding software performs another read (every 20 ms or, depending upon the coding/decoding software—every 5 ms [20 ms/4 sub-frames=5 ms]), new data is stored in the ZS buffer.

What is claimed is:

1. A device for storing and reproducing digital data, comprising a digital signal processor (DSP) and an electrically erasable, programmable read-only-memory (EEProm), with a number of parallel input/output interfaces (D0*–D7*) of the read-only-memory, which are directly connected via a data/address bus (BUS) to parallel input/output interfaces (D0–D7) of the digital signal processor (DSP) with no other devices connected to said data/address bus, and wherein the connectors for address and control ($\overline{CE}$, CLE, ALE, Ready) of the read-only-memory (EEProm) are directly connected to other input/output interfaces (D8–D11) of the digital signal processor (DSP) by control lines (8–11), and wherein a write enable connector (WR) and a read enable connector (RD) of the digital signal processor (DSP) are directly connected by a first line (W) and by a second line (R) respectively to a write enable (WR') and a read enable (RD') connector of the read-only-memory with no other device connected to said first line and said second line.

2. A device as claimed in claim 1, in which the read-only-memory is a block-structured read-only-memory for mass storage applications.

3. A device as claimed in claim 2, in which the digital data are speech data.

4. A device as claimed in claim 1, wherein the electrically erasable, programmable read-only-memory (EEProm) is a flash EEPROM.

5. A device as claimed in claim 1, in which the digital data are speech data.

6. A device for storing and reproducing digital data as defined in claim 1, wherein the programmable read-only-memory (EEProm) is divided into a number of segments ($S_1$–$S_n$), wherein the digital signal processor (DSP) has a memory (DSP-S) for storage of digital data in a size equal to the size of a segment of the programmable read-only-memory, and wherein the digital signal processor further controls transfer of data to and from its memory and segments of the programmable read-only-memory via the write enable connector (WD) and the read enable connector (RD) of the digital signal processor respectively connected to the write enable (WR') and read enable (RD') connectors of the programmable read-only-memory and further via the input/output interface (D8–D11) of the digital signal processor and the connectors ($\overline{CE}$, CLE, ALE, Ready) of the programmable read-only-memory.

7. A device for storing and reproducing digital data, comprising a digital signal processor (DSP) and an electrically erasable, programmable read-only-memory (EEProm) connected thereto, which is divided into a number of segments ($S_1-S_n$), wherein the digital signal processor (DSP) defines a buffer (ZS) of the size of a segment of the read-only-memory (EEProm) and an overflow memory (ÜS), and wherein software drivers and encoding and decoding software are implemented in the digital signal processor (DSP) so that reading and writing of data between a segment of the programmable read-only-memory and the buffer of the digital signal processor occurs under the control of the software drivers and encoding and decoding software, and that during said reading and writing of data, other data intended for writing into buffer (ZS) is written into the overflow memory (ÜS) to prevent data loss, and that said data written in the overflow memory (ÜS) is written to the buffer (ZS) after the writing process between the buffer (ZS) and the programmable read-only-memory (EEProm) is completed.

8. A device as claimed in claim 7, wherein the electrically erasable, programmable read-only-memory (EEProm) is a flash EEPROM.

9. A method for storing digital data by means of a digital signal processor (DSP) and an electrically erasable, programmable read-only-memory (EEProm), wherein the digital data are written into a buffer (ZS) of a memory (DSP-S) in the digital signal processor (DSP), where the digital data of the buffer (ZS) are written into a selected segment of the read-only-memory (EEProm) by means of a software driver, and wherein any other data produced during the writing process which is to be transferred to the buffer (ZS) are first written into an overflow memory (ÜS) of memory (DSP-S) in the digital signal processor (DSP), and are later copied into the buffer (ZS) after the writing process.

10. A method as claimed in claim 9 wherein, to reproduce previously stored digital data, the selected segment of the read-only-memory (EEProm) is addressed, and the data contained in the selected segments are read and loaded into the buffer (ZS).

* * * * *